(No Model.)

J. S. FOLEY.
BRAKE FOR CYCLES.

No. 539,125. Patented May 14, 1895.

Witnesses
J. A. Fairgrieve
E. Everett Ellis

Inventor
James Samuel Foley
by Foster Freeman
Attorneys.

UNITED STATES PATENT OFFICE.

JAMES SAMUEL FOLEY, OF WEST BROMWICH, ENGLAND.

BRAKE FOR CYCLES.

SPECIFICATION forming part of Letters Patent No. 539,125, dated May 14, 1895.

Application filed November 23, 1894. Serial No. 529,719. (No model.)

*To all whom it may concern:*

Be it known that I, JAMES SAMUEL FOLEY, a citizen of the United States, residing at West Bromwich, England, have invented certain new and useful Improvements in or Relating to Brakes for Cycles, of which the following is a specification.

My invention relates to brakes for velocipedes.

The brake which I prefer to employ is of the kind usually known as a spoon brake, applicable to the rim of the wheel or the tire, but I wish to be understood that I can use this invention in connection with other forms of brake, say for example a band brake if necessary. An important feature about this brake is that no special brake lever and fittings are required, the brake itself being applied by the depression of the handle-bar or by a suitable movement of the handles so as to depress the brake.

In order that my said invention may be clearly understood I will now proceed to describe the same with reference by way of example, to the accompanying drawings, wherein—

Figure 1:
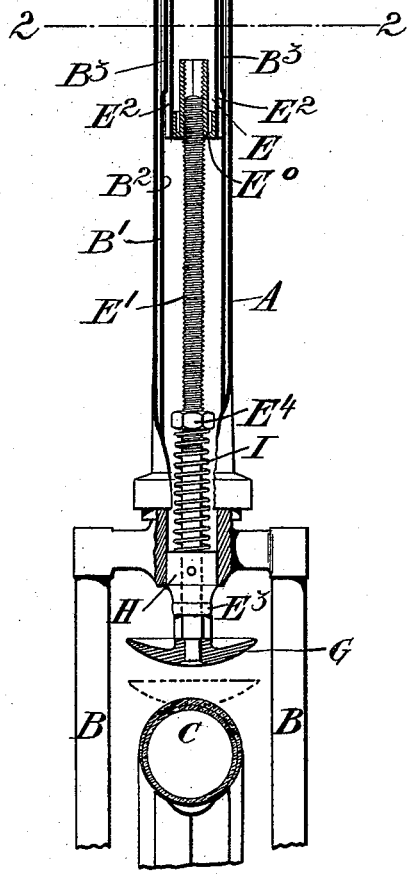
Figure 2:
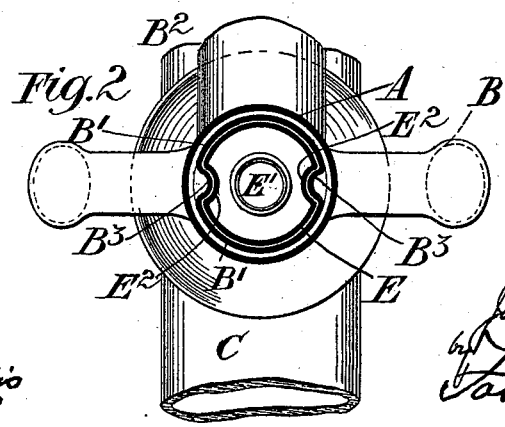

Figure 1 is a vertical central section of as much of the steering-head, front fork, and front road-wheel of a bicycle as is necessary to the proper understanding of my invention. Fig. 2 is drawn to a larger scale and is a horizontal section on the line 2 2 of Fig. 1.

Like letters indicate like parts throughout the drawings.

A is the steering head.

B is the front fork.

B' is the fork stem, which is hollow.

C is the tire of the front road wheel.

D is the handle-bar which is attached to a spindle E. The spindle E is adapted to slide endwise in a guide $B^2$ formed by the interior of the fork stem B'.

G is the brake-shoe, attached to a brake-stem E' screwed centrally into the lower end of the spindle E so as to lie normally, immediately above the tire C of the road-wheel. By screwing the brake stem into or out of the spindle E the level of the handle bar can be altered as desired. In the lower end of the spindle E is fixed a long nut $E^0$ which is split lengthwise and takes a firm grip upon the brake stem to prevent it from turning accidentally after adjustment.

In the fork-stem B' feathers or ribs $B^3$ are formed. They enter grooves $E^2$ formed in the spindle E and prevent rotation of the spindle relatively to the fork stem, while permitting movement of the spindle in the direction of its own length and not interfering with the rotation of the fork-stem for steering.

The brake-stem E' is screw-threaded throughout the greater part of its length. Near its lower end just above the brake-shoe is a washer $E^3$ preferably of leather which encircles the stem just below a socket H secured in the lower end of the fork stem by a screw or other fastening. This washer prevents the passage of dirt to the interior of the fork-stem.

$E^4$ is a nut screwed on to the brake stem E' above the socket H.

I is a helical spring which encircles the brake stem and is retained between the socket H and nut $E^4$. It serves to keep the brake-stem normally at the upper end of its stroke.

J is a strap adjustable upon the spindle E. It serves to limit the downward movement of the spindle to the desired extent.

To put the brake on all that is necessary is to depress the handle-bar D and with it the spindle E and stem E' thus forcing the brake spoon G directly into contact with the tire C against the pressure of the spring I, which latter acts as soon as permitted by the rider, to restore the handle-bar D to its original position and take off the brake.

If desired the handle-bar D can be fixed and the brake locked out of use by any suitable means, as for instance, by the strap J which can be fixed at any desired position. Also any convenient means may be used to fix the brake in its operative position hard upon the wheel to prevent the machine being moved in its owner's absence.

It will be evident that this invention may be applied to operate a band or other brake upon the hub of the wheel or the axle by means of suitable connecting devices.

I claim—

1. In a velocipede, the combination with the tubular fork-stem, of a handle bar mounted on a spindle movable lengthwise within said stem, a brake connected to said spindle, and adapted to be operated by the depression of said handle-bar and means to prevent independent turning of the spindle and stem, substantially as described.

2. In a velocipede, the combination with the tubular fork-stem, of a handle bar mounted on a spindle movable lengthwise within said stem, a brake shoe connected to the lower end of said spindle, and a feather to prevent turning of the spindle within the stem, substantially as described.

3. In a velocipede, the combination with the tubular fork-stem formed internally as a guide, of a grooved handle-bar-spindle fitting movably within said stem and provided with a brake shoe, a stop to limit the upward movement of the spindle, and a spring to maintain the spindle normally against the stop, as set forth.

4. In a velocipede, the combination with the tubular fork-stem, of a handle bar carried by a spindle movable lengthwise within said stem, a brake shoe, an adjustable connection between said shoe and the lower end of said spindle, and means to prevent independent turning of the spindle and stem, substantially as described.

5. In a velocipede the combination with the steering-head of a tubular fork-stem a collar in its lower end, a handle-bar-spindle within the fork-stem, a brake-stem passing through the collar and screwed centrally into the spindle, a brake spoon, devices to limit the upward and downward travel of the spindle and a nut $E^4$ and spring for the purposes specified.

In testimony whereof I have hereto set my hand in the presence of the two subscribing witnesses.

JAMES SAMUEL FOLEY.

Witnesses:
ALFRED J. BOULT,
HARRY B. BRIDGES.